US009455833B2

(12) United States Patent
Michiels et al.

(10) Patent No.: US 9,455,833 B2
(45) Date of Patent: Sep. 27, 2016

(54) BEHAVIORAL FINGERPRINT IN A WHITE-BOX IMPLEMENTATION

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 14/263,372

(22) Filed: Apr. 28, 2014

(65) Prior Publication Data

US 2015/0312039 A1 Oct. 29, 2015

(51) Int. Cl.
*G06F 21/14* (2013.01)
*H04L 9/32* (2006.01)
*H04L 9/06* (2006.01)

(52) U.S. Cl.
CPC ............ *H04L 9/3231* (2013.01); *G06F 21/14* (2013.01); *H04L 9/0625* (2013.01); *H04L 9/0631* (2013.01); *H04L 2209/043* (2013.01); *H04L 2209/16* (2013.01)

(58) Field of Classification Search
None
See application file for complete search history.

(56) References Cited

U.S. PATENT DOCUMENTS 8,306,216 B2  11/2012  Michiels et al.
8,418,006 B1*  4/2013  Trimberger ................. 714/725
2007/0014394 A1  1/2007  Harder et al.
2010/0296649 A1*  11/2010  Katzenbeisser et al. ....... 380/28
2011/0116630 A1*  5/2011  Billet et al. ................... 380/268
2015/0121073 A1*  4/2015  Wajs ............................ 713/168

OTHER PUBLICATIONS

"Syncrosoft MCFACT—Secure Data Processing Technology", Re-trust Sixth Quarterly Meeting, Mar. 11, 2008, Villach, Austria, 108 pages.
Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.
Delerablee, Cecile et al; "White-Box Security Notions for Symmetric Encryption Schemes"; International Association for Cryptologic Research, vol. 20130830:084255; retrieved from the Internet Aug. 22, 2013; pp. 1-23; (Aug. 22, 2013).
Michels, Wil; "Opportunities in White-Box Cryptography"; IEEE Computer and Reliability Societies; IEEE Service Center, Security & Privacy, Los Alamitos, CA, US, vol. 6, No. 1; 4 pages (Jan./Feb. 2010).
Extended European Search Report for application No. 15165301.1 (Oct. 2, 2015).

* cited by examiner

*Primary Examiner* — David Pearson

(57) ABSTRACT

A method of determining a fingerprint identification of a cryptographic implementation in a cryptographic system, including: receiving, by the cryptographic system, an input message that is a fingerprint identification message; performing, by the cryptographic system, a keyed cryptographic operation mapping the fingerprint identification message into an output message that includes a fingerprint identification; and outputting the output message.

30 Claims, 5 Drawing Sheets

BEHAVIORAL FINGERPRINT IN A WHITE-BOX IMPLEMENTATION

TECHNICAL FIELD

Various exemplary embodiments disclosed herein relate generally to realizing a behavioral fingerprint in a white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of determining a fingerprint identification of a cryptographic implementation in a cryptographic system, including: receiving, by the cryptographic system, an input message that is a fingerprint identification message; performing, by the cryptographic system, a keyed cryptographic operation mapping the fingerprint identification message into an output message that includes a fingerprint identification; and outputting the output message.

Various embodiments are described wherein performing a keyed cryptographic operation mapping the fingerprint identification message into an output message further includes: determining that the input message is a fingerprint identification message; and modifying the output of the cryptographic operation when the input message is a fingerprint identification message.

Various embodiments are described wherein modifying the output of the cryptographic operation includes using a user specific value to modify the output.

Various embodiments are described wherein, mapping the fingerprint identification message into an output message includes a plurality of rounds wherein the rounds include a non-linear mapping function and a state of keyed cryptographic operation, one of the rounds includes determining that the input message is the fingerprint identification message by comparing a portion of the state in the round with the value that results for portion of the state when the input message is the fingerprint identification message, and the one round includes modifying the output of the cryptographic operation when the input message is a fingerprint identification message.

Various embodiments are described wherein modifying the output of the cryptographic operation includes combining a user specific value with the portion of the state.

Various embodiments are described wherein comparing a portion of the state in the round with the value that results for a portion of the state when the input message is the fingerprint identification message includes comparing the output of the non-linear function in the round with the value that results from the non-linear function when the input message is the fingerprint identification message.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein the cryptographic system includes a network of lookup tables, the cryptographic operation is an advanced encryption system (AES) operation including a plurality of rounds and a state of the AES operation, one of the AES rounds includes determining that the input message is a fingerprint identification message by comparing a portion of the state in the round with the value that results for a portion of the state when the input message is the fingerprint identification message, and the one AES round includes modifying the output of the S-boxes when the input message is a fingerprint identification message to combine a user specific value with the output of the S-boxes.

Various embodiments are described wherein comparing a portion of the state in the round with the value that results for a portion of the state when the input message is the fingerprint identification message includes comparing the outputs of S-boxes in the round with the value that results from the S-boxes when the input message is the fingerprint identification message.

Further, various exemplary embodiments relate to a method of producing a cryptographic implementation of a cryptographic operation mapping an input message to an output message in a cryptographic system that determines a fingerprint identification of the cryptographic implementation, including: producing a cryptographic implementation of the keyed cryptographic operation; receiving information specifying at least one fingerprint message and a user specific value; modifying the cryptographic implementation based upon the received information specifying a fingerprint message and a user specific value so that: when a received input message is one of the fingerprint messages, the cryptographic implementation outputs an output message based upon the user specific value; and when a received input message is not one of the fingerprint messages, the cryptographic implementation outputs an output message associated with the received input message based upon the cryptographic operation.

Various embodiments are described wherein, mapping the fingerprint identification message into an output message includes a plurality of rounds wherein the rounds include a non-linear mapping function and a state of keyed cryptographic operation, and modifying the cryptographic implementation includes modifying one of the rounds to determine that the input message is one of the fingerprint identification messages by comparing a portion of the state in the one round with the value that results for a portion of the state when the input message is one of the fingerprint identification messages, and modifying the one round to modify the output of the cryptographic operation when the input message is one of the fingerprint identification messages.

Various embodiments are described wherein modifying the output of the cryptographic operation includes combining a user specific value with the portion of the state.

Various embodiments are described wherein receiving information specifying at least one fingerprint message and a user specific value includes receiving a plurality of fingerprint messages and a plurality of user specific values, wherein each fingerprint message is associated with one of the plurality of user specific values.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein, the cryptographic system includes a network of lookup tables, the cryptographic operation is an advanced encryption system (AES) operation including a plurality of rounds and a state of the AES operation, and modifying the cryptographic implementation includes modifying one of the AES rounds to determine that the input message is one of the fingerprint identification messages by comparing a portion of the state in the round with the value that results for a portion of the state when the input message is on of the fingerprint identification messages, and modifying the one AES round to modify the output of the S-boxes when the input message is one of the fingerprint identification messages to combine a user specific value with the output of the S-boxes.

Further, various exemplary embodiments relate to a non-transitory machine-readable storage medium encoded with instructions for execution by a cryptographic implementation in a cryptographic system for determining a fingerprint identification, the non-transitory machine-readable storage medium including: instructions for receiving, by the cryptographic system, an input message that is a fingerprint identification message; instructions for performing, by the cryptographic system, a keyed cryptographic operation mapping the fingerprint identification message into an output message that includes a fingerprint identification; and instructions for outputting the output message.

Various embodiments are described wherein performing a keyed cryptographic operation mapping the fingerprint identification message into an output message further includes: instructions for determining that the input message is a fingerprint identification message; and instructions for modifying the output of the cryptographic operation when the input message is a fingerprint identification message.

Various embodiments are described wherein modifying the output of the cryptographic operation includes using a user specific value to modify the output.

Various embodiments are described wherein, mapping the fingerprint identification message into an output message includes a plurality of rounds wherein the rounds include a non-linear mapping function and a state of keyed cryptographic operation, one of the rounds includes determining that the input message is the fingerprint identification message by comparing a portion of the state in the round with the value that results for portion of the state when the input message is the fingerprint identification message, and the one round includes modifying the output of the cryptographic operation when the input message is a fingerprint identification message.

Various embodiments are described wherein modifying the output of the cryptographic operation includes combining a user specific value with the portion of the state.

Various embodiments are described wherein comparing a portion of the state in the round with the value that results for a portion of the state when the input message is the fingerprint identification message includes comparing the output of the non-linear function in the round with the value that results from the non-linear function when the input message is the fingerprint identification message.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein the cryptographic system includes a network of lookup tables, the cryptographic operation is an advanced encryption system (AES) operation including a plurality of rounds and a state of the AES operation, one of the AES rounds includes determining that the input message is a fingerprint identification message by comparing a portion of the state in the round with the value that results for a portion of the state when the input message is the fingerprint identification message, and the one AES round includes modifying the output of the S-boxes when the input message is a fingerprint identification message to combine a user specific value with the output of the S-boxes.

Various embodiments are described wherein instructions for comparing a portion of the state in the round with the value that results for a portion of the state when the input message is the fingerprint identification message includes instructions for comparing the outputs of S-boxes in the round with the value that results from the S-boxes when the input message is the fingerprint identification message.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
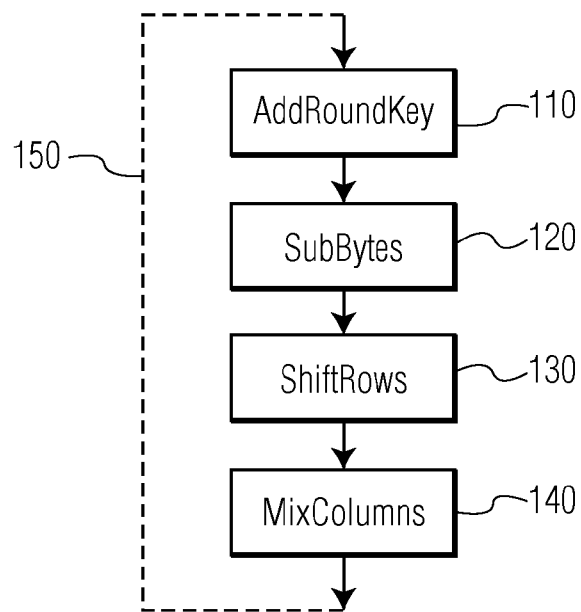
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The discussion below is directed to white-box cryptography because it is the most challenging attack model. Further, many cryptographic implementations are deployed and used in an environment where they are subject to a white-box attack. There is also a black-box attack model and a grey-box attack model. In the black-box attack model, it is assumed that the attacker only has access to the input and output of the implementation. In the grey-box attack model, it is assumed, that in addition the access to the input and the output of the implementation, that the attacker has access to side channel information regarding the execution of the implementation. Such side channel information may include power, timing, electronic emissions, etc. Accordingly, the benefits of the embodiments described below may be used to prevent any of these various levels of attack as well as others that may be defined. Therefore, where white-box implementations are described, it is intended that they may include black-box implementations as well as grey-box implementations that use the various methods described in the embodiments below.

A typical problem with a software implementation of a cryptographic algorithm is code lifting. Accordingly, a white-box implementation, although it may effectively hide a cryptographic key, may still be distributed as a whole. This white-box implementation may be as valuable as the key itself. If, for instance, the white-box implementation implements a decryption algorithm, then by not having the key, the receiver may not be able to encrypt messages, but the white-box implementation is sufficient to decrypt messages. This means that an adversary illegitimately distributes the white-box implementation as a whole instead of the underlying hidden cryptographic key, which typically is of high value that should not be distributed in an uncontrolled way.

However, on the positive side, software solutions are relatively easy to replace. That is, once the (financial) damage caused by the illegitimate distribution of white-box implementations is considered too large, one may opt for replacing the white-box implementations by a new one. Alternatively, the key (i.e., the white-box implementation) may regularly be changed, where a new white-box implementation is not provided to users that have shown illegitimate behavior to discourage illegitimate behavior and to prevent these persons/devices from trying to copy the white-box implementation again. Typically, the key is only present implicitly. In other embodiments, the key may include dynamic keys that, for example, take implicit key information and combine it with some sort of dynamic information to change the key used in the cryptographic function.

In order to do this, a way of determining the original owner of a leaked white-box implementation is needed. U.S. Pat. No. 8,306,216 describes a method for putting a fingerprint in each white-box implementation. More precisely, it describes a method for constructing a table-based white-box implementations such that if one leaks, it may be traced back the source by inspecting the lookup-table contents in the implementation. The problem with the method is that it can be quite hard and time consuming to find the fingerprint in a collection of lookup tables because an adversary may have applied obfuscation techniques to them. Accordingly, there remains a need to embed a fingerprint in a white-box implementation such that the original owner may be determined by the functional behavior of the white-box implementation. The embodiments described below illustrate such a method.

Accordingly, to identify a copy of a specific white-box implementation, the code does not need to be analyzed, but instead the function of the white-box implementation is observed. This may be done in a way that does not noticeably affect the normal functioning of the white-box implementation. Hence, an adversary cannot hide the fingerprint of the white-box implementation that was copied by obfuscating the white-box implementation.

Typically, the message space of a cryptographic algorithm is large. For instance, for AES the 128-bit data blocks result in a message space of size $2^{128}$. The embodiments described below implement a cryptographic algorithm A by a white-box implementation (e.g., table based), such that for a small number k of messages M, the algorithm may give an incorrect outcome. These incorrect outcomes are such that for each two users it holds that their white-box implementations have a different outcome at least for one of the k messages. The outcomes for the k messages M are used as a fingerprint of an implementation, i.e., to trace it back to the original owner. The message M is also called the fingerprint message.

As indicated, the value k should be small. More precisely, this means that the k fingerprint-messages have a negligible probability to occur during normal execution. This is true for instance if k=1 and if M is chosen at random.

This may be realized as follows. White-box implementations (e.g., table-based ones) are obfuscated implementations of a cryptographic algorithm A. Into such a white-box implementation, the computation of a predicate $P(m) \in \{0,1\}$ may be implemented in an obfuscated way, where m is any input message and where P(m)=0 if m is not one of the k messages for which we may have an incorrect outcome and P(m)=1 if m is one of those k messages. In the case where P(m)=1, the implementation of A is changed such that it results in an incorrect answer. In the case where P(m)=0, the implementation of A provides the correct answer. As the total white-box implementation is heavily obfuscated, the fingerprint-part is hard to detect and remove or modify.

Now an example white-box implementation of AES will be described. White-box cryptography is the discipline of implementing a cryptographic algorithm in software such that it is difficult for an attacker to find the key. Hereby, the strongest conceivable (but for software most realistic) attack model is assumed in which the adversary is assumed to have full control over and full access to the white-box implementation.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round is includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
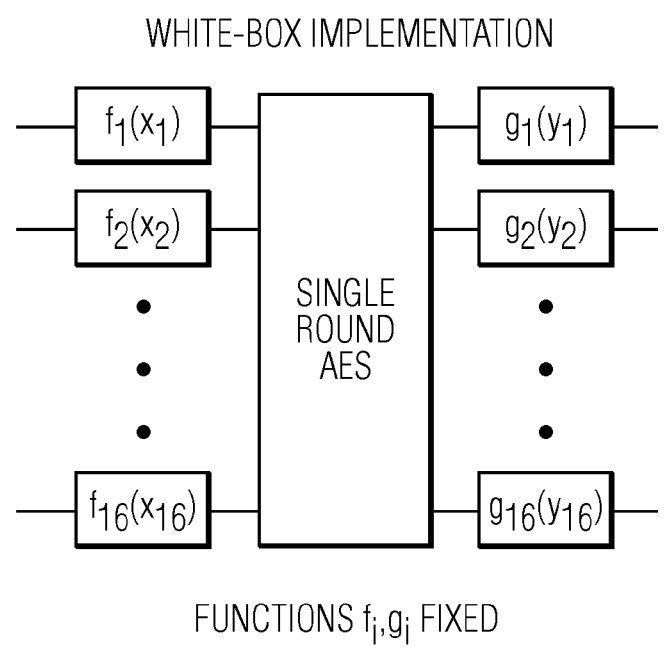
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}$, $x_{1,2}$, $x_{1,3}$, . . . $x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function for input byte $x_{i,j}$ as $T_{i,j}(x_{i,j})=S(x_{i,j} \oplus k_{i,j})$ where $k_{i,j}$ is a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}$, $y_{2,j}$, $y_{3,j}$, and $y_{4,j}$ via the algebraic expression $z_{l,j}=MC_{l,1} \cdot y_{1,j} \oplus MC_{l,2} \cdot y_{2,j} \oplus MC_{l,3} \, y_{3,j} \oplus MC_{l,4} \, y_{4,j}$ in $GF(2^8)$ for some constants $MC_{l,r}$.

Now define a lookup table for each byte-to-byte function $Q_{i,j,l}(x_{i,j})=MC_{l,i} \cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
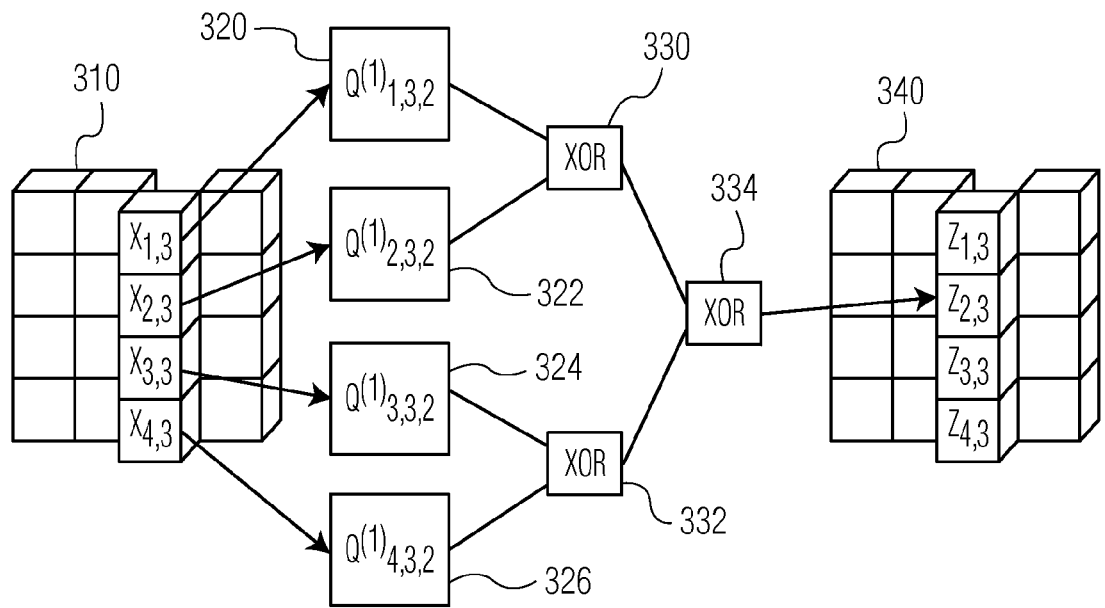
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}$, $x_{2,3}$, $x_{3,3}$, and $X_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
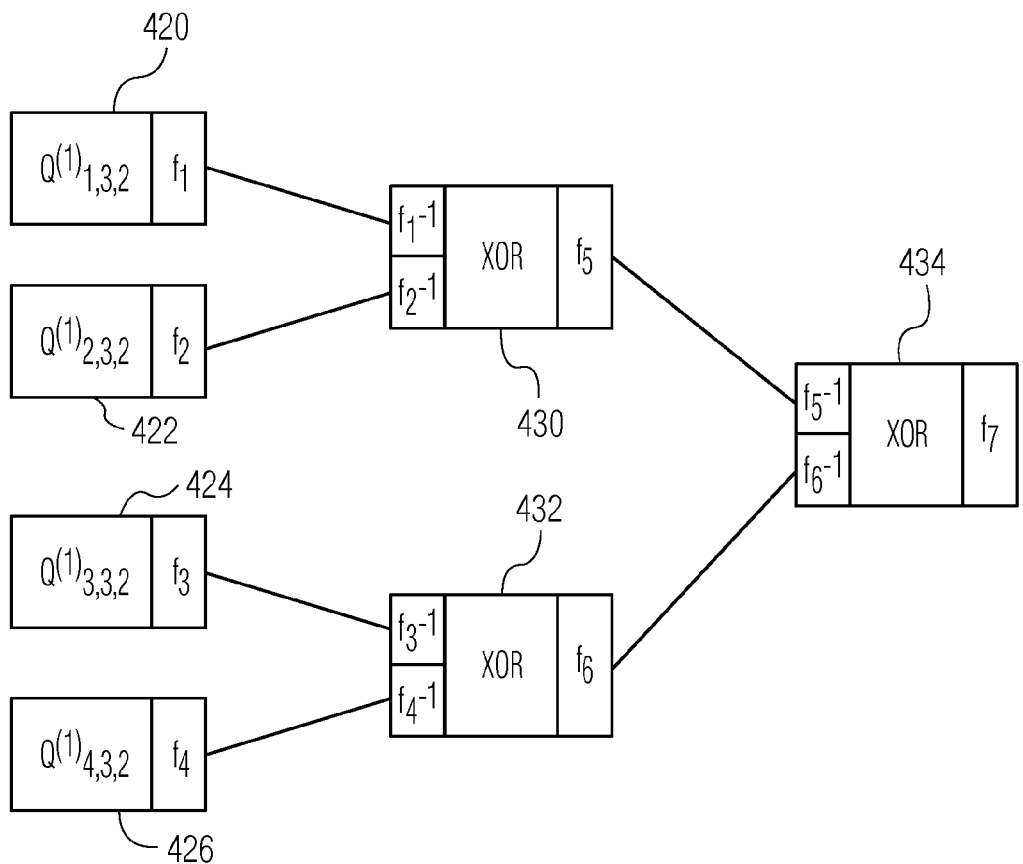
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

Now an embodiment of implementing fingerprint identification of a white-box implementation is described where k=1. That is, there is exactly one message M out of the total of $2^{128}$ for which the white-box implementations of the different users give a different behavior. The message M may be called the fingerprint identification message. Furthermore, the output result of the white-box implementations for this fingerprint identification message M identifies the specific white-box implementation and may be used for traitor tracing. This output result may be called the fingerprint identification. Note that if M is chosen at random, the probability that M is encountered by accident is $2^{128}$, which is obviously negligible (the probability is as large as the probability that an AES-key is found by random guessing).

Figure 5:
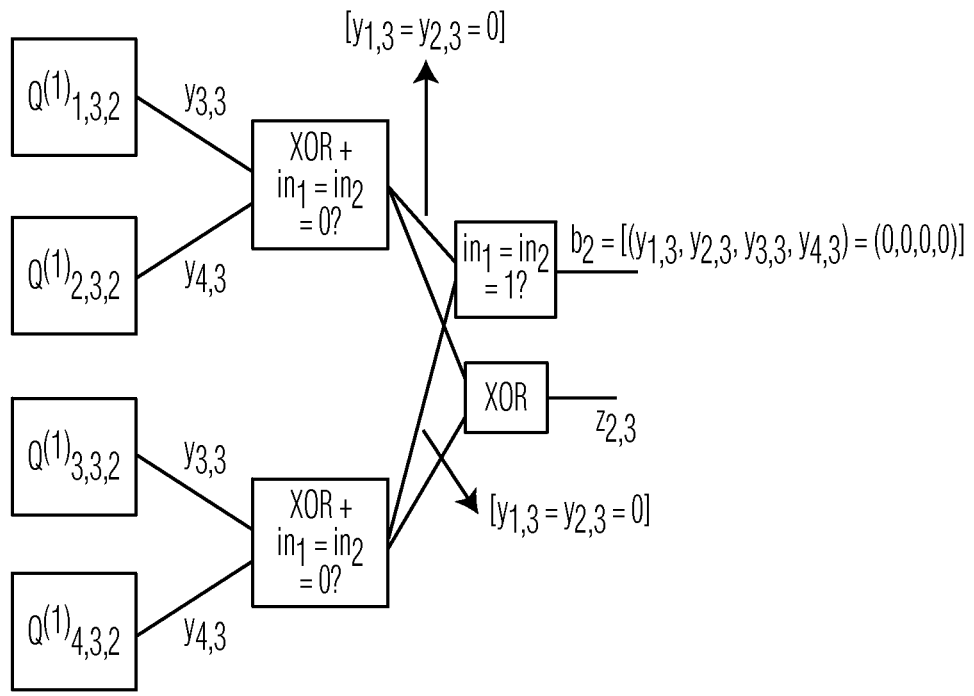
FIG. 5 illustrates a white-box implementation that implements a fingerprint identification

The starting point for describing the fingerprint identification is the non-obfuscated implementation of a white-box implementation shown in FIG. 3. For convenience in describing this embodiment, it will be assumed that message M selected results in that the output of the S-box is 0 for all input bytes of the first round. As described later this can be changed to accommodate any randomly selected message(s) M. Consider the two XOR tables 330, 332 that directly succeed the Q-tables 320, 322, 324, 326 in FIG. 3. These 8-to-4 bit XOR tables 330, 332 may be extended to 8-to-5 bit tables 530, 532, where the added bit equals 1 if and only if the two input parameters are both 0, which results when the message M is input to the Q tables as illustrated in FIG. 5. FIG. 5 illustrates a white-box implementation that implements a fingerprint identification. These two bits are input to a table 540 that computes the AND of the input bits. Hence, the outcome $b_2$ of this table equals 1 if and only if its two input parameters are both 1. In other words, $b_2=1$ if and only if all 4 output nibbles of the Q-tables equal 0.

Figure 6:
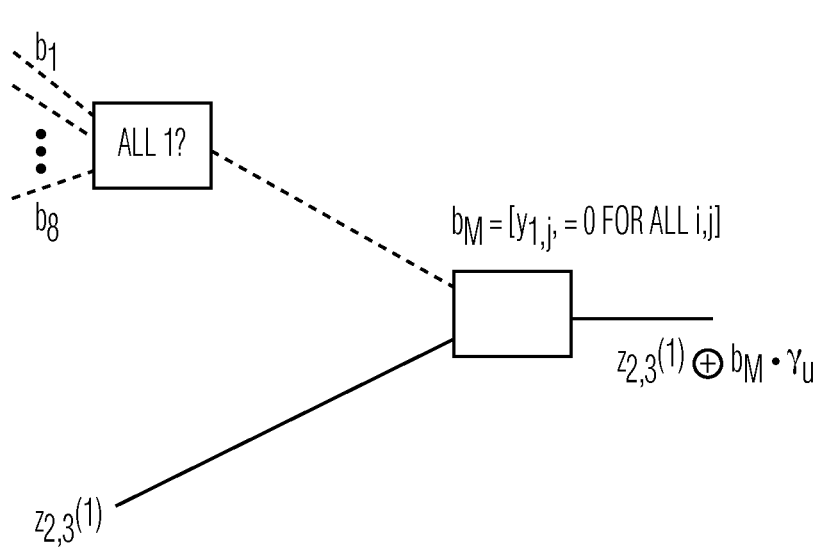
FIG. 6 illustrates a network combing bits to determine if the input message is a fingerprint identification message.

For each column of the output state, this extension may be applied to the computation of both nibbles of a single output byte $z_{i,j}$. This results in 8 bits $b_1$, . . . , $b_8$. All 8 bits $b_1, \ldots, b_8$ may be input to an AND-network 640 as depicted in FIG. 6. FIG. 6 illustrates a network combining bits to determine if the input message is a fingerprint identification message. It can easily be seen that the computed bit $b_M$ equals 1 if and only if the output of the S-box is 0 for all 16 input bytes of the first round. The bit $b_M$ is then input to a table 650 together with the output nibble $z_{2,3}^{(1)}$ that was computed in the table network of FIG. 5. If $b_M=1$, then the table adds to $z_{2,3}^{(1)}$ a user specific value $\gamma_u$. Otherwise, it does nothing, that is it simply passes the value of $z_{2,3}^{(1)}$. Hence, if b=0, the implementation of AES does not change, so it works properly. If, on the other hand, b=1, then a value $\gamma_u$ is added to $z_{2,3}^{(1)}$ which results in an incorrect computation.

Furthermore, the different values of $\gamma_u$ result in different outcomes. In this case both $z_{2,3}^{(1)}$ and $\gamma_u$ are 4-bit values.

Hence, this results in a way of creating $2^4=16$ (i.e., the number of choices for $\gamma_u$) different white-box implementations that are all uniquely identifiable by the outcome when the unique message M is input in the first round because of the property that the outcome of each of the 16 S-boxes in the first round is 0. Note that for user u with $\gamma_u=0$ the white-box implementation also gives a correct outcome for b=1. However, because this is the only of the 16 users with this property, this resulting correct behavior still functions as a fingerprint.

Furthermore, the embodiment may easily be adapted to any other message M, which may be selected randomly. In this case, the tables 530, 532 compare the input nibbles with values v1 and v2 that are produced by the Q-box when the message M is input to the white-box implementation. The values v1 and v2 may be different for each of the different Q-boxes and depends on the message M chosen to be the fingerprint identification message used to determine the fingerprint of the specific white-box implementation. As noted, above dynamic keys may be used in the white-box implementation. One way to implement dynamic keys is to change the Q-boxes where key is combined with the S-box. Accordingly, the values v1 and v2 then would vary according to the specific dynamic key. Thus, the values for v1 and v2 may be data arrays that are indexed based upon the specific dynamic key used, in order to determine when the message M is received. Another way to accommodate dynamic keys, would be to have specific message M associated with each dynamic key, where the output for the specific message results in the fingerprint identification that identifies the specific white-box implementation. Other methods may be used to implement dynamic keys, and the fingerprint capability described herein may be applied to these other methods.

Also, while the example is shown of evaluating the outputs of the Q-boxes to determine when the message M is input, it is also possible that the check may be made at the input to the Q-boxes, or at another point in the round. That is, the value of the state or a portion of the state may be checked anywhere in the round for a specific value that would correspond to the input message M. Also, it is noted that the any two nibbles (or any number of nibbles) may be used to make the comparison to determine that a message M is present.

Additionally, by applying the approach of FIG. 5 to multiple output nibbles $z_{i,j}^{(n)}$, more than 16 fingerprinted white-box implementations may be realized. For example if $\gamma_u$ is a 32 bit value, then $2^{32}$ different fingerprint may be realized. In this case the value $\gamma_u$ may be applied across 8 nibbles of the different output nibbles $z_{i,j}^{(n)}$ resulting in $2^{32}$ different possible fingerprint identifications. Further, as mentioned above more than one message M may be used to generate the fingerprint information. In such a situation, the specific input message M producing a specific output message that contains a fingerprint identification may be linked to specific instances of the white-box implementations that may be associated with a specific user or group of users.

Figure 7:
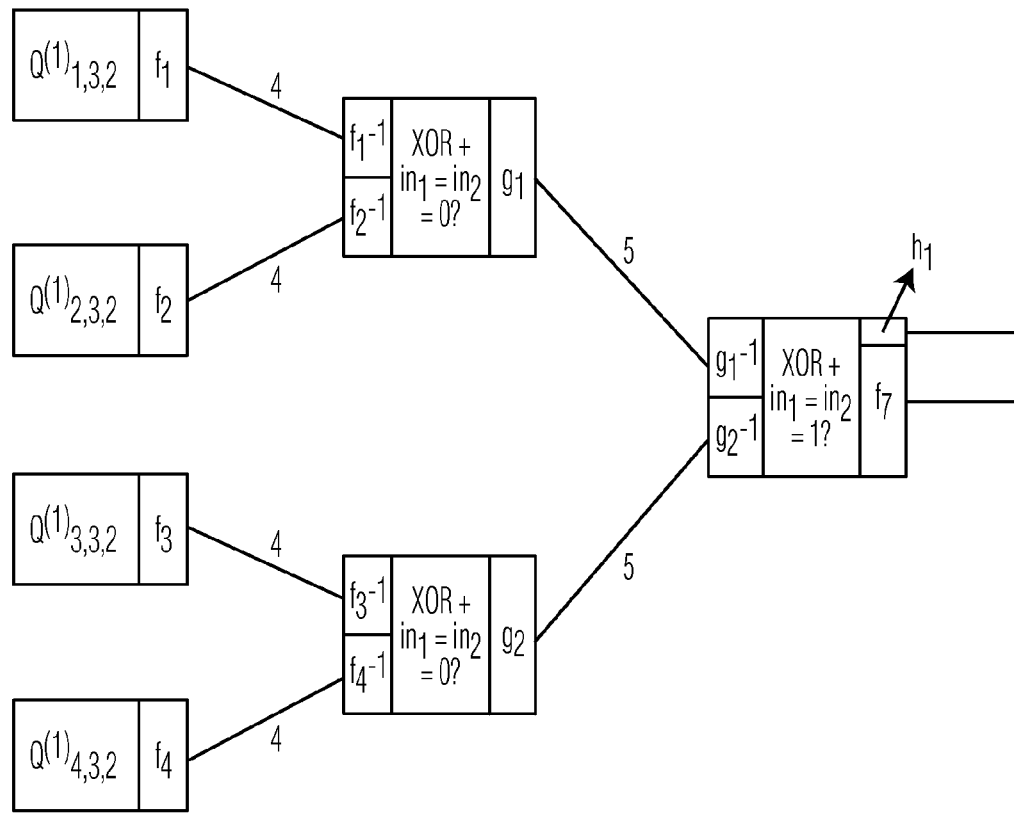
FIG. 7 illustrates an obscured white-box implementation as shown in FIG. 5.
Figure 8:
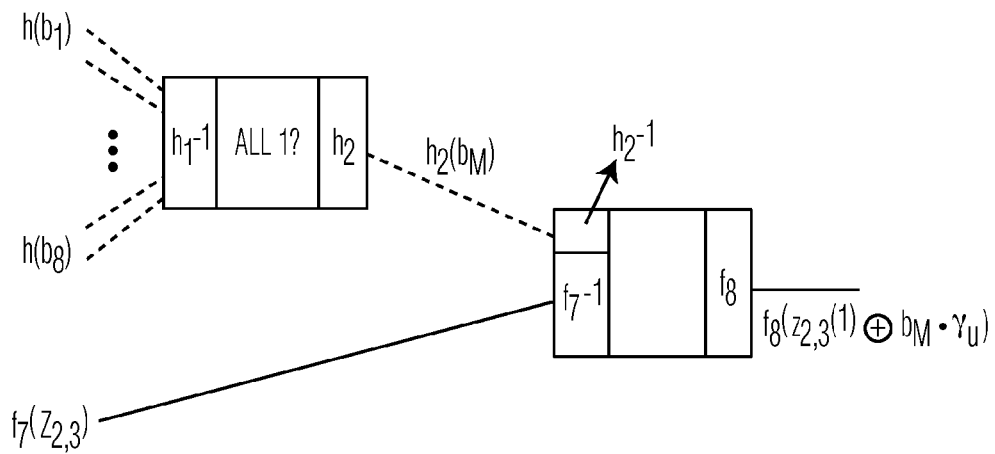
FIG. 8 illustrates an obscured white-box implementation as shown in FIG. 6.

In a last step of creating the white-box implementation the various tables may be obfuscated as in FIGS. 7 and 8. In FIGS. 7 and 8 the various blocks having similar numbers correspond to blocks in FIGS. 5 and 6. Further it is noted that in FIG. 7, block 834 combines the two blocks 534 and 540 from FIG. 5. This obscuring may done in the same manner as described above in the initial description of the table based AES white-box implementation.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

In addition to the computer program being implemented on a non-transitory computer readable medium, such computer program may be transmitted to a user or user device for installation and use. This may be done over any communication network, for example, the internet.

Further, user devices implementing the embodiments described herein may include, smart cards, payment cards, transit cards, access cards and devices, mobile phones, tablets, personal digital assistants, portable and desktop computers, set-top boxes, digital video records, media streaming devices, etc. Uses of the embodiments described above may include payment software, security access, parking access, transit access and payments, banking, software and digital media transmission, secure communications, content distribution, etc.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Figure 9:
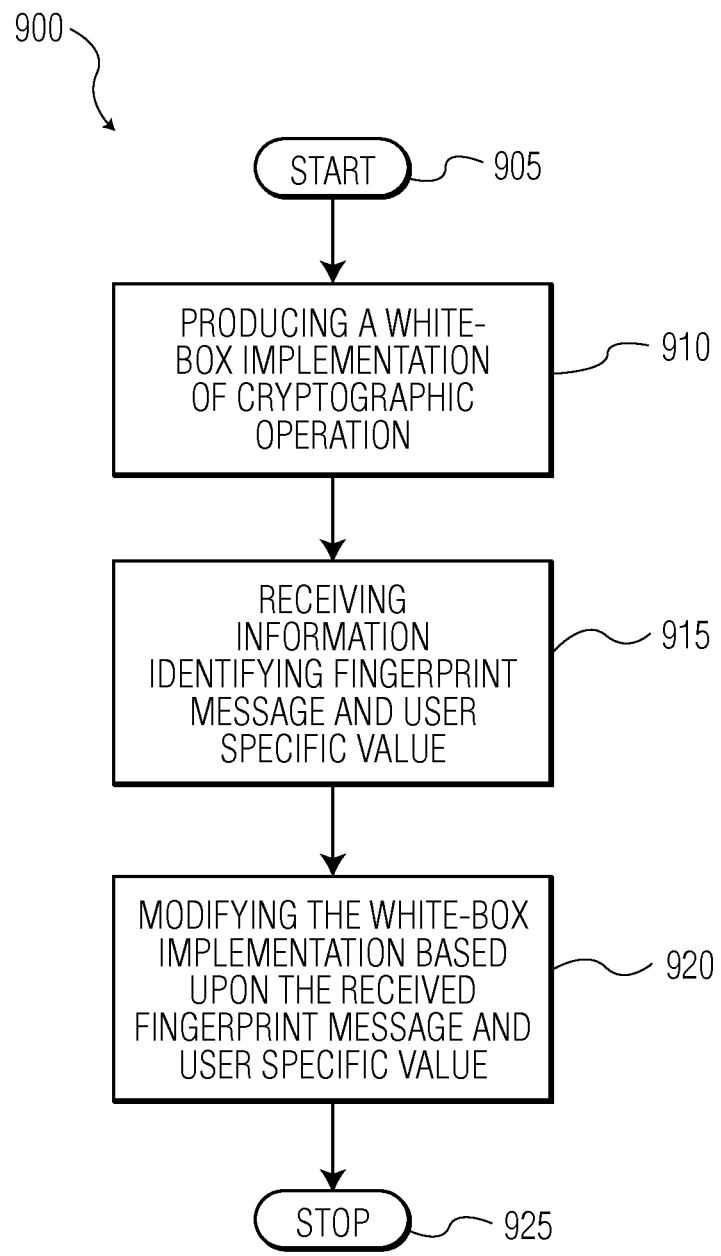
FIG. 9 is a flow chart illustrating a method of implementing a white-box implementation that determines a fingerprint identification of a white-box implementation.

FIG. 9 is a flow chart illustrating a method of implementing a white-box implementation that determines a fingerprint identification of a white-box implementation. First, the method begins 905. Then, a white-box implementation of the cryptographic operation is produced 910. This may be produced as described above using various methods and implementations. Next, information identifying a fingerprint identification message M that produces the fingerprint and the specific fingerprint value $\gamma_u$ may be received 915. Then, the white-box implementation may be modified based upon the received information identifying fingerprint identification message M and the user specific value fingerprint identification 920 so that: when an input a specific fingerprint identification message M is received the white-box implementation produces a fingerprint identification identifying a user associated with the specific instance of the white-box implementation; and when any other input message is received, the white-box implementation outputs the correct output message associated with the input message. The method may then end 925. It should be noted that more than one fingerprint identification message may be received that allows multiple ways to get the fingerprint identification. Further, more than one user specific value $\gamma_u$ may also be supplied. For example, a user may have multiple identifications, and each identification may result from different fingerprint identification messages.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of determining a fingerprint identification of a cryptographic implementation in a cryptographic system, comprising:
   receiving, by the cryptographic system, an input message that is a fingerprint identification message;
   performing, by the cryptographic system, a keyed cryptographic operation mapping the fingerprint identification message into an output message that includes a fingerprint identification, wherein the output message is one of a plurality of incorrect outcomes of the keyed cryptographic operation; and
   outputting the output message.

2. The method of claim 1, wherein performing a keyed cryptographic operation mapping the fingerprint identification message into an output message further comprises:
   determining that the input message is a fingerprint identification message; and
   modifying the output of the cryptographic operation when the input message is a fingerprint identification message.

3. The method of claim 2, wherein modifying the output of the cryptographic operation includes using a user specific value to modify the output.

4. The method of claim 1, wherein,
   mapping the fingerprint identification message into an output message includes a plurality of rounds wherein the rounds include a non-linear mapping function and a state of keyed cryptographic operation,
   one of the rounds includes determining that the input message is the fingerprint identification message by comparing a portion of the state in the round with the value that results for portion of the state when the input message is the fingerprint identification message, and the one round includes modifying the output of the cryptographic operation when the input message is a fingerprint identification message.

5. The method of claim 4, wherein modifying the output of the cryptographic operation includes combining a user specific value with the portion of the state.

6. The method of claim 4, wherein comparing a portion of the state in the round with the value that results for a portion of the state when the input message is the fingerprint identification message includes comparing the output of the non-linear function in the round with the value that results from the non-linear function when the input message is the fingerprint identification message.

7. The method of claim 1, wherein the cryptographic system includes a network of finite state machines.

8. The method of claim 1, wherein the cryptographic system includes a network of lookup tables.

9. The method of claim 1, wherein the cryptographic operation is one of advanced encryption system (AES) or data encryption standard (DES).

10. The method of claim 1, wherein
    the cryptographic system includes a network of lookup tables,
    the cryptographic operation is an advanced encryption system (AES) operation including a plurality of rounds and a state of the AES operation,
    one of the AES rounds includes determining that the input message is a fingerprint identification message by comparing a portion of the state in the round with the value that results for a portion of the state when the input message is the fingerprint identification message, and
    the one AES round includes modifying the output of the S-boxes when the input message is a fingerprint identification message to combine a user specific value with the output of the S-boxes.

11. The method of claim 10, wherein comparing a portion of the state in the round with the value that results for a portion of the state when the input message is the fingerprint identification message includes comparing the outputs of S-boxes in the round with the value that results from the S-boxes when the input message is the fingerprint identification message.

12. A method of producing a cryptographic implementation of a cryptographic operation mapping an input message to an output message in a cryptographic system that determines a fingerprint identification of the cryptographic implementation, comprising:
    producing a cryptographic implementation of the keyed cryptographic operation;
    receiving information specifying at least one fingerprint message and a user specific value;
    modifying the cryptographic implementation based upon the received information specifying a fingerprint message and a user specific value so that:
    when a received input message is one of the fingerprint messages, the cryptographic implementation outputs an output message based upon the user specific value, wherein the output message is one of a plurality of incorrect outcomes of the keyed cryptographic operation; and
    when a received input message is not one of the fingerprint messages, the cryptographic implementation outputs an output message associated with the received input message based upon the cryptographic operation.

13. The method of claim 12, wherein,
    mapping the fingerprint identification message into an output message includes a plurality of rounds wherein the rounds include a non-linear mapping function and a state of keyed cryptographic operation, and modifying the cryptographic implementation includes modifying one of the rounds to determine that the input message is one of the fingerprint identification messages by comparing a portion of the state in the one round with the value that results for a portion of the state when the input message is one of the fingerprint identification messages, and modifying the one round to modify the output of the cryptographic operation when the input message is one of the fingerprint identification messages.

14. The method of claim 13, wherein modifying the output of the cryptographic operation includes combining a user specific value with the portion of the state.

15. The method of claim 12, wherein receiving information specifying at least one fingerprint message and a user specific value comprises receiving a plurality of fingerprint messages and a plurality of user specific values, wherein each fingerprint message is associated with one of the plurality of user specific values.

16. The method of claim 12, wherein the cryptographic system includes a network of finite state machines.

17. The method of claim 12, wherein the cryptographic system includes a network of lookup tables.

18. The method of claim 12, wherein the cryptographic operation is one of advanced encryption system (AES) or data encryption standard (DES).

19. The method of claim 12, wherein, the cryptographic system includes a network of lookup tables, the cryptographic operation is an advanced encryption system (AES) operation including a plurality of rounds and a state of the AES operation, and modifying the cryptographic implementation includes modifying one of the AES rounds to determine that the input message is one of the fingerprint identification messages by comparing a portion of the state in the round with the value that results for a portion of the state when the input message is one of the fingerprint identification messages, and modifying the one AES round to modify the output of the S-boxes when the input message is one of the fingerprint identification messages to combine a user specific value with the output of the S-boxes.

20. A non-transitory machine-readable storage medium encoded with instructions for execution by a cryptographic implementation in a cryptographic system for determining a fingerprint identification, the non-transitory machine-readable storage medium comprising:

instructions for receiving, by the cryptographic system, an input message that is a fingerprint identification message;

instructions for performing, by the cryptographic system, a keyed cryptographic operation mapping the fingerprint identification message into an output message that includes a fingerprint identification, wherein the output message is one of a plurality of incorrect outcomes of the keyed cryptographic operation; and instructions for outputting the output message.

21. The non-transitory machine-readable storage medium of claim 20, wherein performing a keyed cryptographic operation mapping the fingerprint identification message into an output message further comprises:

instructions for determining that the input message is a fingerprint identification message; and instructions for modifying the output of the cryptographic operation when the input message is a fingerprint identification message.

22. The non-transitory machine-readable storage medium of claim 21, wherein modifying the output of the cryptographic operation includes using a user specific value to modify the output.

23. The non-transitory machine-readable storage medium of claim 20, wherein, mapping the fingerprint identification message into an output message includes a plurality of rounds wherein the rounds include a non-linear mapping function and a state of keyed cryptographic operation, one of the rounds includes determining that the input message is the fingerprint identification message by comparing a portion of the state in the round with the value that results for portion of the state when the input message is the fingerprint identification message, and the one round includes modifying the output of the cryptographic operation when the input message is a fingerprint identification message.

24. The non-transitory machine-readable storage medium of claim 23, wherein modifying the output of the cryptographic operation includes combining a user specific value with the portion of the state.

25. The non-transitory machine-readable storage medium of claim 23, wherein comparing a portion of the state in the round with the value that results for a portion of the state when the input message is the fingerprint identification message includes comparing the output of the non-linear function in the round with the value that results from the non-linear function when the input message is the fingerprint identification message.

26. The non-transitory machine-readable storage medium of claim 20, wherein the cryptographic system includes a network of finite state machines.

27. The non-transitory machine-readable storage medium of claim 20, wherein the cryptographic system includes a network of lookup tables.

28. The non-transitory machine-readable storage medium of claim 20, wherein the cryptographic operation is one of advanced encryption system (AES) or data encryption standard (DES).

29. The non-transitory machine-readable storage medium of claim 20, wherein the cryptographic system includes a network of lookup tables, the cryptographic operation is an advanced encryption system (AES) operation including a plurality of rounds and a state of the AES operation, one of the AES rounds includes determining that the input message is a fingerprint identification message by comparing a portion of the state in the round with the value that results for a portion of the state when the input message is the fingerprint identification message, and the one AES round includes modifying the output of the S-boxes when the input message is a fingerprint identification message to combine a user specific value with the output of the S-boxes.

30. The non-transitory machine-readable storage medium of claim 29, wherein instructions for comparing a portion of the state in the round with the value that results for a portion of the state when the input message is the fingerprint identification message includes instructions for comparing the outputs of S-boxes in the round with the value that results from the S-boxes when the input message is the fingerprint identification message.

* * * * *